(12) United States Patent
Haartsen

(10) Patent No.: US 10,608,809 B2
(45) Date of Patent: Mar. 31, 2020

(54) ADAPTIVE TIMING SYNCHRONIZATION IN PACKET BASED RADIO SYSTEMS

(71) Applicant: Plantronics, Inc., Santa Cruz, CA (US)

(72) Inventor: Jacobus Cornelis Haartsen, Rolde (NL)

(73) Assignee: Plantronics, Inc., Santa Cruz, CA (US)

(*) Notice: Subject to any disclaimer, the term of this patent is extended or adjusted under 35 U.S.C. 154(b) by 27 days.

(21) Appl. No.: 15/969,702

(22) Filed: May 2, 2018

(65) Prior Publication Data
US 2019/0342068 A1    Nov. 7, 2019

(51) Int. Cl.
*H04L 7/10*     (2006.01)
*H04L 27/26*    (2006.01)
*H04W 72/12*    (2009.01)
*H04W 84/18*    (2009.01)

(52) U.S. Cl.
CPC .......... *H04L 7/10* (2013.01); *H04L 27/2656* (2013.01); *H04W 72/1257* (2013.01); *H04W 84/18* (2013.01)

(58) Field of Classification Search
CPC ... H04W 72/1257; H04L 7/10; H04L 27/2656
See application file for complete search history.

(56) References Cited

U.S. PATENT DOCUMENTS

| 6,665,281 | B1  | 12/2003 | Kim |
| 2003/0099207 | A1  | 5/2003 | Yamato |
| 2009/0190566 | A1* | 7/2009 | Kwon ............ H04W 74/02 370/345 |
| 2009/0204265 | A1* | 8/2009 | Hackett .......... G05B 19/4185 700/284 |
| 2014/0185494 | A1* | 7/2014 | Yang ............. H04W 56/0005 370/280 |
| 2017/0133878 | A1  | 5/2017 | Bull et al. |

OTHER PUBLICATIONS

Roche (Time Synchronization in Wireless Networks, Class Notes, Washington University, ST), Apr. 2006. (Year: 2006).*
PCT International Search Report and Written Opinion for International Application No. PCT/US2019/029669, dated Jul. 15, 2019 (12 pages).
Bruno et al., "Bluetooth: Architecture, protocols and scheduling algorithms," *Cluster Computing*, (Apr. 1, 2002), 5(2):117-131.
Bernardo et al., "A Wireless Sensor MAC Protocol for Bursty Data Traffic," IEEE 18th International Symposium on Personal, Indoor and Mobile Radio Communications (Sep. 1, 2007) pp. 1-5.

* cited by examiner

*Primary Examiner* — Zhensheng Zhang
(74) *Attorney, Agent, or Firm* — Chuang Intellectual Property Law

(57) ABSTRACT

Methods and apparatuses for adaptive timing synchronization are described. In one example, a method includes determining a data communications packet length relative to a data communications slot length in a time-slotted data communications connection to identify a duty cycle parameter. The method further includes transmitting data communications packets between a first device and a second device utilizing an adaptive timing method. The adaptive timing method includes selecting from a random timing communications method or a synchronization timing communications method responsive to the duty cycle parameter being above or below a predetermined value.

16 Claims, 17 Drawing Sheets

Table 1000

| | type | # of Bytes | modulation | peak rate |
|---|---|---|---|---|
| 1002 — | EV3 | 1 to 30 | GFSK | 1 Mb/s |
| 1004 — | 2-EV3 | 1 to 60 | π/4-DQPSK | 2 Mb/s |
| 1006 — | 3-EV3 | 1 to 90 | 8-DPSK | 3 Mb/s |

FIG. 10

Table 1200

| $T_{rep}$ (ms) | $R_{codec}$ (kb/s) | $N_{bit}$ | Packet type | $L_{packet}$ (μs) | Sync |
|---|---|---|---|---|---|
| 3.75 | 32 | 120 | EV3 | 262 | No |
| | | | 2-EV3 | 212 | No |
| | | | 3-EV3 | 190 | No |
| | 64 | 240 | EV3 | 382 | Yes |
| | | | 2-EV3 | 272 | No |
| | | | 3-EV3 | 230 | No |
| | 96 | 360 | EV3 | - | - |
| | | | 2-EV3 | 332 | Yes |
| | | | 3-EV3 | 270 | No |
| | 128 | 480 | EV3 | - | - |
| | | | 2-EV3 | 392 | Yes |
| | | | 3-EV3 | 310 | No |
| 5 | 32 | 160 | EV3 | 302 | No |
| | | | 2-EV3 | 232 | No |
| | | | 3-EV3 | 203 | No |
| | 64 | 320 | EV3 | - | - |
| | | | 2-EV3 | 312 | No |
| | | | 3-EV3 | 256 | No |
| | 96 | 480 | EV3 | - | - |
| | | | 2-EV3 | 392 | Yes |
| | | | 3-EV3 | 310 | No |
| | 128 | 640 | EV3 | - | - |
| | | | 2-EV3 | - | - |
| | | | 3-EV3 | 363 | Yes |
| 7.5 | 32 | 240 | EV3 | 382 | Yes |
| | | | 2-EV3 | 272 | No |
| | | | 3-EV3 | 230 | No |
| | 64 | 480 | EV3 | - | - |
| | | | 2-EV3 | 392 | Yes |
| | | | 3-EV3 | 310 | No |
| | 96 | 720 | EV3 | - | - |
| | | | 2-EV3 | - | - |
| | | | 3-EV3 | 390 | Yes |
| 10 | 32 | 320 | EV3 | - | - |
| | | | 2-EV3 | 312 | No |
| | | | 3-EV3 | 256 | No |
| | 64 | 640 | EV3 | - | - |
| | | | 2-EV3 | - | - |
| | | | 3-EV3 | 363 | Yes |
| 15 | 32 | 480 | EV3 | - | - |
| | | | 2-EV3 | 392 | Yes |
| | | | 3-EV3 | 310 | No |

FIG. 12

Table 1300

| $R_{codec}$ | $T_{rep}$ | Packet type | # retransmissions | synchronization |
|---|---|---|---|---|
| 128 | 3.75 | 2-EV3 | < 1 | Frame sync |
|  |  |  | ≥ 1 | Interval sync |
|  |  | 3-EV3 | - | No sync |
|  | 5 | 3-EV3 | < 2 | Frame sync |
|  |  |  | ≥ 2 | Interval sync |
| 64 | 3.75 | 2-EV3 | - | No sync |
|  | 7.5 | 2-EV3 | < 3 | Frame sync |
|  |  |  | ≥ 3 | Interval sync |
| 32 | 7.5 | EV3 | < 3 | Frame sync |
|  |  |  | ≥ 3 | Interval sync |
|  |  | 2-EV3 | - | No sync |
|  | 10 | 2-EV3 | - | No sync |
|  |  | 3-EV3 | - | No sync |
|  | 15 | 2-EV3 | < 6 | Frame sync |
|  |  |  | ≥ 6 | Interval sync |
|  |  | 3-EV3 | - | No sync |

FIG. 13

ADAPTIVE TIMING SYNCHRONIZATION IN PACKET BASED RADIO SYSTEMS

BACKGROUND OF THE INVENTION

In enterprise applications, achievable user density in wireless voice communications is an important figure of merit, both for systems using Bluetooth protocols as well as other packet-based radio systems. One factor adversely impacting achievable user density is interference. For example, since the first release of the standard in 1999, the Bluetooth wireless technology has seen a major uptake for use in short-range communications. Making use of unlicensed spectrum in the 2.4 GHz ISM band, Bluetooth must share the spectrum with other users, including other Bluetooth users. Being an ad-hoc system, Bluetooth does not coordinate its communication with other systems. Instead, it relies on its frequency hopping capability to deal with interference.

In a typical enterprise usage scenario, numerous base stations are located within a building space. To each base station, a single headset is connected, together forming an independent piconet. The headsets are scattered around the base stations. A frequent topic of discussion is the density of users that can be achieved without noticeable interference, with higher user density naturally being the goal. In Bluetooth, voice is compressed and sent in a series of short packets to the receiver. A packet may be interfered by packets from other Bluetooth transmitters, or by signals from other transmitters in the ISM band. For example, one major source of interference in the 2.4 GHz ISM band is the WiFi system based on the IEEE 802.11 standard. Factors affecting whether a packet is interfered with and lost include (1) the strength of the interference power with respect to the strength of the intended received power, (2) whether the packets (partly) overlap in time, and (3) whether the packets make use of the same (or near-adjacent) carrier frequency. As use of packet-based radio systems continues to increase, improved technologies, methods, and apparatuses for packet-based radio systems are needed.

BRIEF DESCRIPTION OF THE DRAWINGS

The present invention will be readily understood by the following detailed description in conjunction with the accompanying drawings, wherein like reference numerals designate like structural elements.

FIG. 10 is a table illustrating data packet types.

FIG. 12 is a table illustrating selection of whether timing synchronization is applied or random timing is utilized.

FIG. 13 is a table illustrating lookup of whether frame synchronization, interval synchronization, or random timing is utilized.

DESCRIPTION OF SPECIFIC EMBODIMENTS

Figure 1:
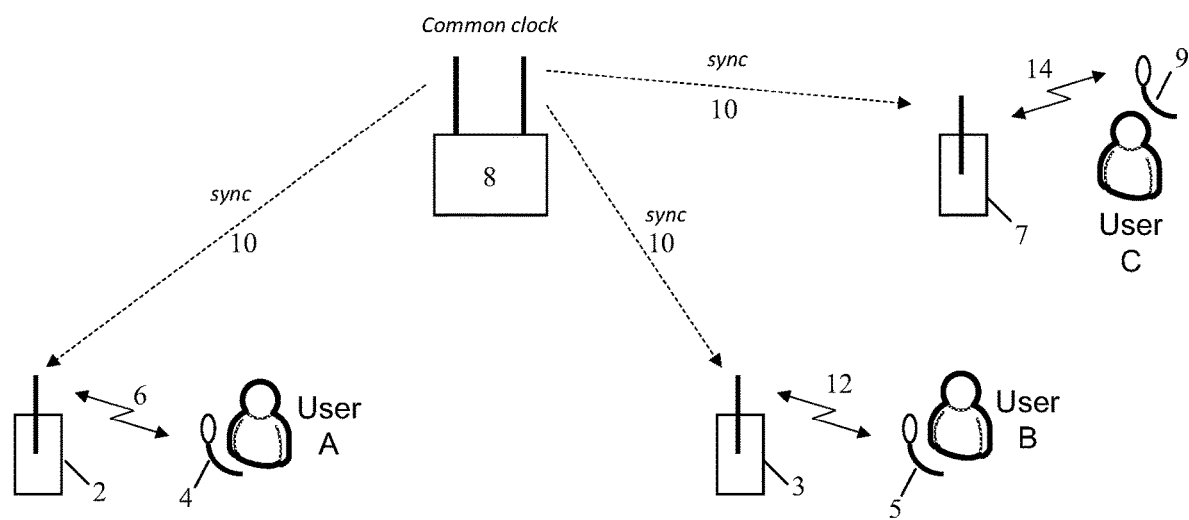
FIG. 1 illustrates a system for adaptive timing synchronization in time-slotted radio technologies in one example.

Methods and apparatuses for adaptive timing synchronization are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various examples of the invention, although different, are not necessarily mutually exclusive. Thus, a particular feature, characteristic, or structure described in one example embodiment may be included within other embodiments unless otherwise noted.

Most wireless system today use a fixed set of link parameters, including the applied voice codec rate, the latency, and the error resiliency. More advanced systems may apply parameter adaptation, where the parameter set may change depending on the environmental conditions and/or the user preferences. For example, in a sparsely populated area, voice rate may be increased (e.g., to wideband voice), or the rate of packet transmissions may be increased to reduce latency, both enhancing voice quality. Alternatively, additional channel coding may be applied to allow a longer range between the user and his/her base station. These parameter changes may affect the packet length and the duty cycle of the radio transmissions.

The inventor has recognized that adapting the link parameters will have a negative impact on the density if the system is not properly configured. In particular, the timing of transmit and receive in a time-slotted short-range radio technologies like Bluetooth greatly influences the density. In certain examples, the described methods and apparatuses relate to enterprise voice systems applying Bluetooth, Bluetooth Low Energy, DECT, or other time-slotted short-range radio technologies. Apparatuses and methods for adaptive timing behavior of Bluetooth or similar transceivers to provide maximal user density performance are provided.

In one example of the invention, a method includes determining a data communications packet length relative to a data communications slot length in a time-slotted data communications connection to identify a duty cycle parameter. The method further includes transmitting data communications packets between a first device and a second device utilizing an adaptive timing method. The adaptive timing method includes selecting from a random timing communications method or a synchronization timing communications method responsive to the duty cycle parameter being above or below a predetermined value.

In one example, a method includes determining a length of a data communications packet relative to a length of a communications slot in a time-slotted data communications connection to generate a duty cycle parameter. The method includes transmitting data communications packets between a first device and a second device utilizing an adaptive timing method. The adaptive timing method includes selecting one from a random timing communications method, a frame synchronization timing communications method, and a repetition interval synchronization timing communications method. A random timing communications method is selected responsive to the duty cycle parameter being below a predetermined value. A selection is made from between a frame synchronization timing communications method and a repetition interval synchronization timing communications method responsive to the duty cycle parameter being above the predetermined value.

In one example, a method for data communications utilizing a first device includes establishing a time-slotted data communications connection with a second device and transmitting data communications packets to the second device over the time-slotted data communications connection. The method includes receiving a clock signal from a central synchronization controller. The method further includes determining a data communications packet length relative to a data communications slot length in the time-slotted data communications connection to identify a duty cycle parameter. The method includes selecting from a random timing communications method or a synchronization timing communications method responsive to the duty cycle parameter being above or below a predetermined value. The method further includes, responsive to selecting the synchronization timing communications method, utilizing the clock signal to synchronize transmission of data communications packets from the first device to the second device. In one example, the first device is a base device and the second device is a client device.

In a further example, the first device is a client device and the second device is a base device. In this example, the client device (e.g., a headset) is the master on the Bluetooth link. In one embodiment, the headset is connected to a USB dongle coupled to a PC/laptop (e.g., the base device). In a further embodiment, the headset client device operates in multipoint mode and has a connection to more than one host device. For example, the headset could have a connection both to the base station and to a mobile phone. In these cases, the headset is the master. Since the Bluetooth master sets the transmit and receive timing both for the master and the slave(s), it is the master that needs to be synchronized to the common clock reference. So in these cases, the client device is synchronized to the common clock and sets the timing of the data packets exchanged between the client device and the base device. There is no issue of mixing connections where the base station is the synchronized master or where the headset is the synchronized master since the Bluetooth link is symmetric. The master and slave roles are established at connection setup and can be altered later on by a master/slave switch.

In one example, a system includes a central synchronization controller comprising a radio frequency transceiver configured to broadcast a clock signal. The system further includes a base device from a plurality of base devices. The base device is configured to establish a time-slotted data communications connection with a client device and transmit data communications packets to the client device over the time-slotted data communications connection. The base device is configured to receive the clock signal from the central synchronization controller. The base device is further configured to determine a data communications packet length relative to a data communications slot length in a time-slotted data communications connection to identify a duty cycle parameter. The base device is configured to select from a random timing communications method or a synchronization timing communications method responsive to the duty cycle parameter being above or below a predetermined value. The base device is further configured to, responsive to selecting the synchronization timing communications method, utilize the clock signal to synchronize transmission of data communications packets from the base device to the client device.

In one embodiment, the system further includes a second base device from the plurality of base devices. The second base device is configured to establish a second time-slotted data communications connection with a second client device and transmit data communications packets to the second client device over the second time-slotted data communications connection. The second base device receives the clock signal from the central synchronization controller. The second base device is further configured to determine a data communications packet length relative to a data communications slot length in the second time-slotted data communications connection to identify a second duty cycle parameter. The second base device selects from a random timing communications method or a synchronization timing communications method responsive to the second duty cycle parameter being above or below a predetermined value. The second base device is further configured to, responsive to selecting the synchronization timing communications method, utilize the clock signal to synchronize transmission of data communications packets from the second base device to the second client device.

In one example, a method includes determining a data communications packet length in a time-slotted data communications connection. The method further includes transmitting data communications packets between a first device and a second device utilizing an adaptive timing method. The adaptive timing method includes selecting from a random timing communications method or a synchronization timing communications method responsive to the data communications packet length being above or below a predetermined value.

FIG. 1 illustrates a system for adaptive timing synchronization in time-slotted packet based radio technologies in one example. The system includes a central synchronization controller 8 having a radio frequency transceiver broadcasting a synchronization clock signal 10. A base device 2 from a plurality of base devices is configured to establish a time-slotted data communications connection 6 (e.g., a wireless link) with a client device 4 (e.g., a wireless headset) used by User A. Base device 2 transmits data communications packets to the client device 4 at User A over the time-slotted data communications connection 6. Base device 2 receives the synchronization clock signal 10 from the central synchronization controller 8.

In one example, the base device 2 is a Bluetooth base station and the client device 4 is a Bluetooth headset. The time-slotted data communications connection 6 is a Bluetooth protocol connection with a data communications slot length of 625 microseconds.

Base device 2 determines a data communications packet length relative to the data communications slot length in the time-slotted data communications connection 6 to identify a duty cycle parameter. Base device 2 selects from a random timing communications method or a synchronization timing communications method responsive to the duty cycle parameter being above or below a predetermined value. In one example, the duty cycle parameter is a ratio of the data communications packet length and the data communications slot length and the predetermined value is 50 percent. The random timing communications method is selected if the duty cycle parameter is below a predetermined value and the synchronization timing communications method is selected if the duty cycle parameter is above the predetermined value.

Responsive to selecting the synchronization timing communications method, base device 2 utilizes the received synchronization clock signal 10 to synchronize transmission of data communications packets from the base device 2 to the client device 4. In one example, the synchronization timing communication method is a frame synchronization timing communications method.

In one example embodiment, responsive to selecting the synchronization timing communications method, base device 2 selects from between a frame synchronization timing communications method and a repetition interval synchronization timing communications method. To make this selection, base device 2 determines a sum of the data communications packet lengths including retransmissions transmitted during a repetition interval relative to a length of the repetition interval in the time-slotted data communications connection 6 to generate a second duty cycle parameter. Base device 2 selects the frame synchronization timing communications method responsive to the second duty cycle parameter being below a second predetermined value. Base device 2 selects the repetition interval synchronization timing communications method responsive to the second duty cycle parameter being above the second predetermined value. For example, the second predetermined value is 50 percent.

The frame synchronization timing communications method includes aligning frame boundaries of transmissions by a first base device (e.g., base device 2) transmission and transmission by a second base device (e.g., base device 3). Where the time-slotted data communications connection 6 is a Bluetooth protocol connection, the frame boundaries comprise 1.25 millisecond (ms) frames.

The repetition interval synchronization timing communications method includes aligning a repetition interval and first transmissions by the first base device (e.g., base device 2) and the second base device (e.g., base device 3). Where the time-slotted data communications connection 6 is a Bluetooth protocol connection, the repetition interval is a Bluetooth eSCO interval in a Bluetooth Classic implementation or a Bluetooth Connection interval in a Bluetooth Low Energy (BLE) implementation. For example, the repetition interval is 7.5 milliseconds (ms).

A second base device 3 from the plurality of base devices is configured to establish a second time-slotted data communications connection 12 with a second client device 5 used by a User B. The second base device 3 transmits data communications packets to the second client device 5 over the second time-slotted data communications connection 12. Second base device 3 receives the synchronization clock signal 10 from the central synchronization controller 8. Second base device 3 determines a data communications packet length relative to a data communications slot length in the second time-slotted data communications connection 12 to identify a second duty cycle parameter. Second base device 3 selects from a random timing communications method or a synchronization timing communications method responsive to the second duty cycle parameter being above or below a predetermined value.

As with base device 2, responsive to selecting the synchronization timing communications method, second base device 3 utilizes the synchronization clock signal 10 to synchronize transmission of data communications packets from the second base device 3 to the second client device 5 at User B. Transmissions from the base device 2 to the client device 4 and synchronized with transmissions from the second base device 3 to the second client device 5 utilizing the synchronization clock signal 10 received from the central synchronization controller 8. Base device 7 and client device 9 utilized by User C operate in a similar manner utilizing time-slotted data communications connection 14.

Figure 3:
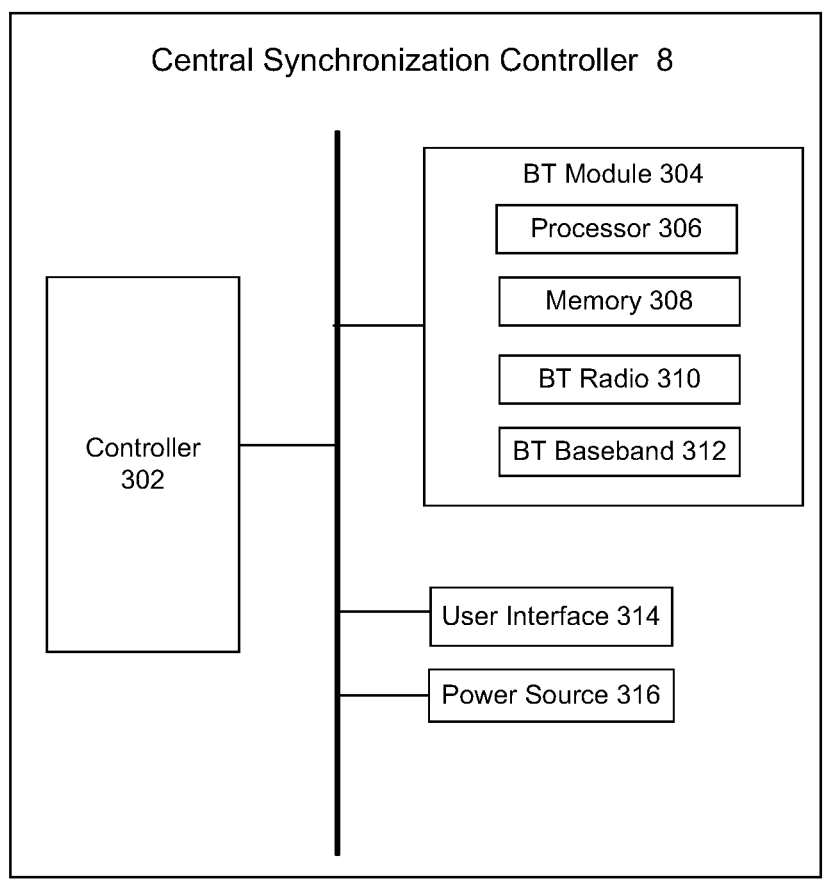
FIG. 3 illustrates the central synchronization controller shown in FIG. 1 in one example.

FIG. 3 illustrates the central synchronization controller 8 shown in FIG. 1 in one example. In a Bluetooth implementation, central synchronization controller 8 includes a controller 302, Bluetooth module 304, user interface 314, and power source 316. For example, central synchronization controller 8 may be a server, personal computer, or other electronic device.

Bluetooth module 304 includes a processor 306, Bluetooth radio 310, and Bluetooth baseband 312. Bluetooth module 304 also includes a memory 308. Processor 306 executes programs stored in memory 308. Bluetooth radio 310 includes an antenna port (not shown), and may be implemented on a separate chip. Bluetooth radio 310 may include a Bluetooth compatible transmitter modulator and a Bluetooth compatible receiver modulator. Bluetooth radio 310 is configured to transmit or receive voice or data packets via an antenna.

Processor 306 may include a variety of processors (e.g., digital signal processors), with conventional CPUs being applicable. Memory 308 may include a variety of memories, and in one example includes RAM, ROM, flash memory, or a combination thereof. Memory 308 may further include separate memory structures or a single integrated memory structure. One or more components of Bluetooth module 304 may be integrated with components at Bluetooth central synchronization controller 8.

In the example shown in FIG. 3, central synchronization controller 8 utilizes Bluetooth. In a further example, an alternative packet-based radio system is utilized, such as Digital Enhanced Cordless Telecommunications (DECT). In certain examples, where frame or interval synchronization is applied, the central synchronization controller 8 transmits the specific timing information for frame and interval synchronization. For Bluetooth, the eSCO (inter-packet) interval is transmitted. The frame timing and the slot timing do not have to be present explicitly as long as the inter-packet interval is an integer multiple of the frame and slot length. In a DECT embodiment, the frame timing is 10 ms, i.e. 24 slots each 416.67 µs in length. The inter-packet interval is a multiple times of 10 ms.

In one embodiment, central synchronization controller 8 transmits a radio beacon including the interval timing for the specific system it will synchronize (e.g., Bluetooth Classic, Bluetooth Low Energy, or DECT). For the beacon interval, the biggest inter-packet interval envisioned is utilized (where shorter intervals will fit in): (a) for Bluetooth Classic: beacon interval is 30 ms (will fit eSCO intervals of 5, 7.5, 10 and 15 ms), (b) for Bluetooth Low Energy: there is no fixed value to give. It may need to be negotiated between the central controller and the individual bases, and (c) for DECT: beacon interval is 20 ms (will fit inter-packet intervals of 10 and 20 ms).

Figure 2:
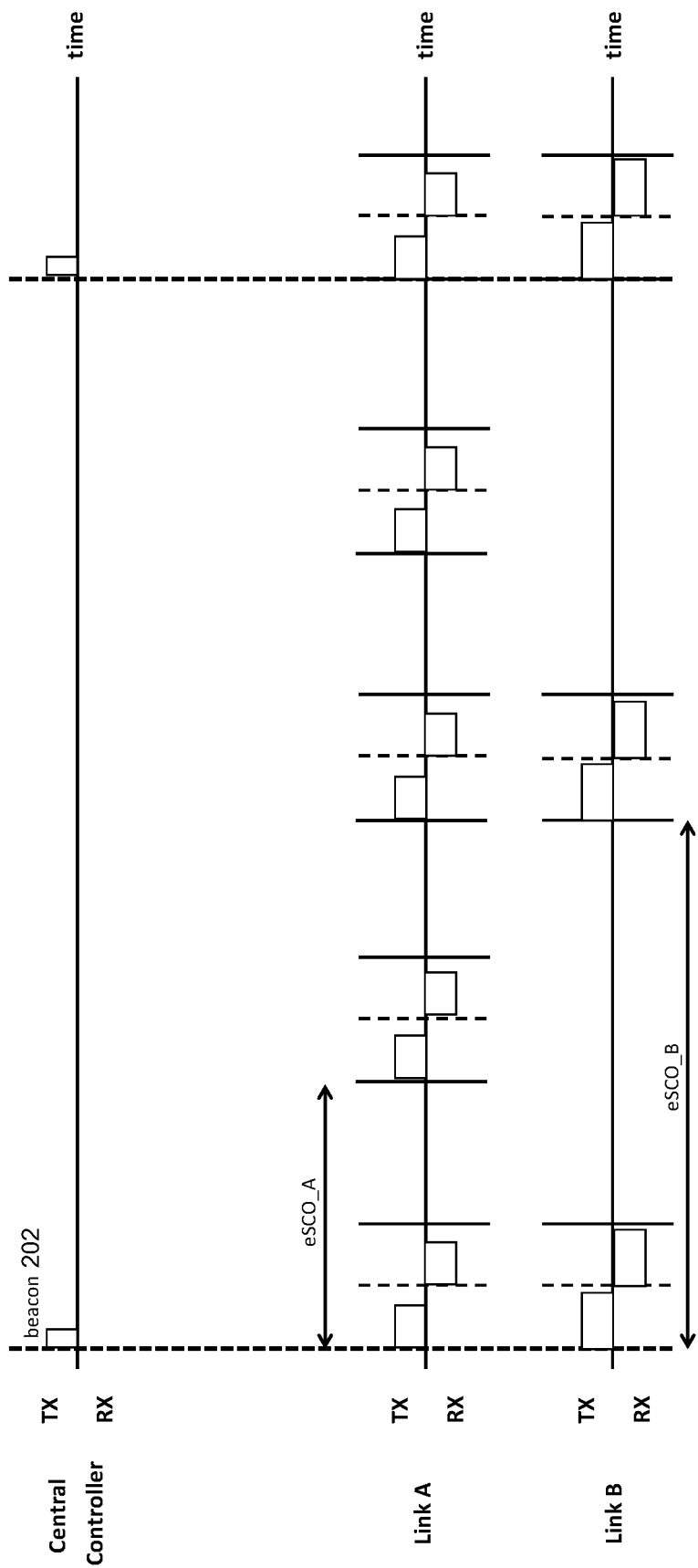
FIG. 2 illustrates timing synchronization utilizing the central synchronization controller shown in FIG. 1 in one example.

In one embodiment, individual base devices 2 have different inter-packet intervals (if they have different voice codec rates, they may apply different inter-packet intervals), as illustrated in FIG. 2 (e.g., for interval synchronization). Links A (e.g., link 6) and B (e.g., link 12) are both synchronized to the beacon 202 (e.g., clock signal 10) of the central synchronization controller 8 but have different eSCO intervals.

In one example, all base devices 2 utilize the same parameters, e.g. the same eSCO interval, the same packet length, etc. In a further example, different base devices 2 may use different link parameters and therefore different synchronization schedules. Locally a base device 2 will decide what synchronization schedule is best for that particular base station. So for a plurality of base devices 2 and users, a certain percentage of users use random timing and another percentage use a frame synchronization.

In one example, central synchronization controller 8 continually broadcasts (i.e., is always present) and each base device 2 locally determines (e.g., based on his look-up table) whether it locks to the beacon or not. In this example, central synchronization controller 8 need not receive communications from the base devices 2. In an alternative embodiment, central synchronization controller 8 receives communications from the base devices 2, which can then indicate whether they randomize their timing or synchronize to the beacon. If all base devices 2 randomize their timing, the central controller 8 does not have to continually send out a beacon.

Figure 4:
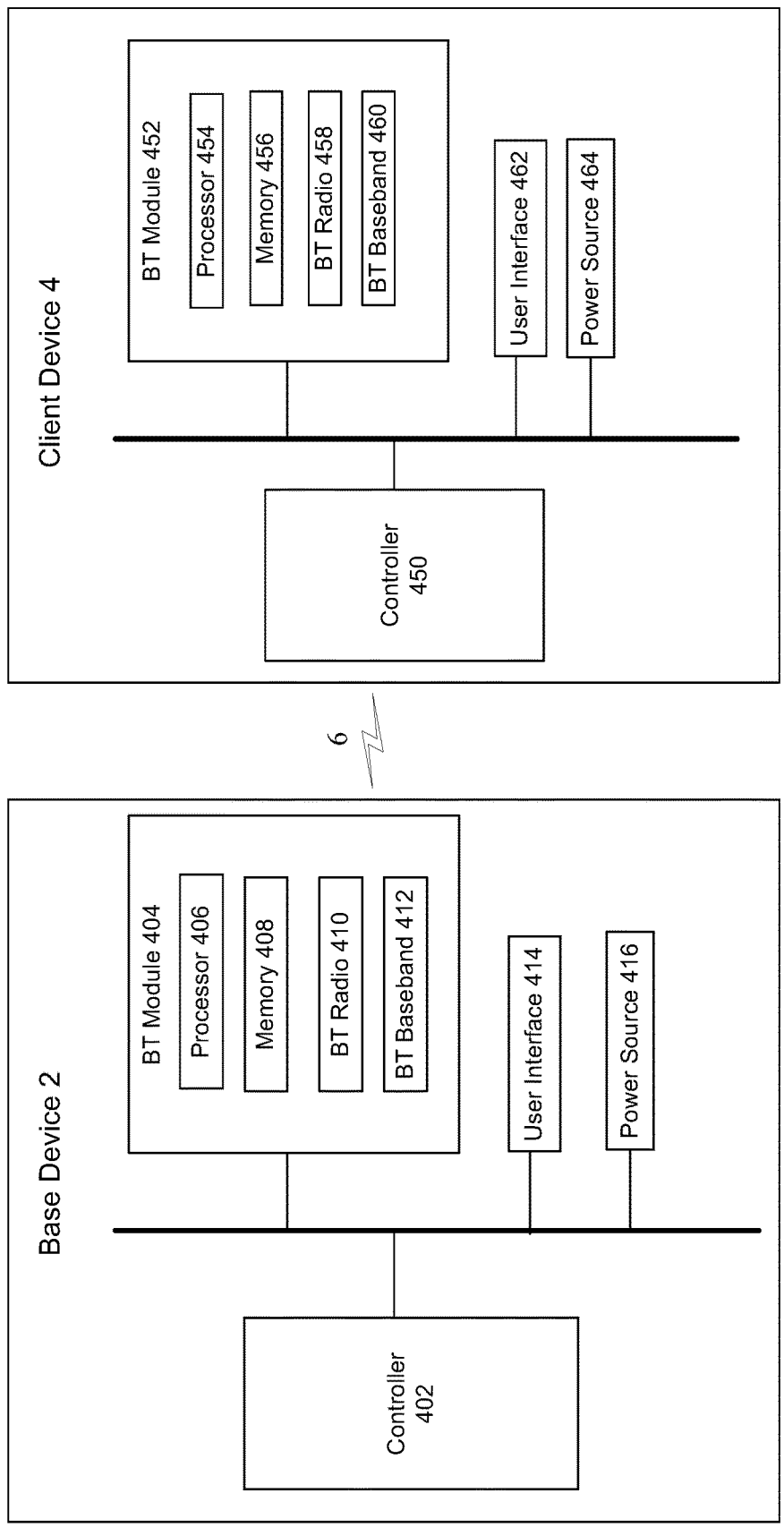
FIG. 4 illustrates the base device and client device shown in FIG. 1 in one example.

FIG. 4 illustrates the base device 2 and client device 4 shown in FIG. 1 in one example. In a Bluetooth implementation, a base device 2 includes a controller 402, Bluetooth module 404, user interface 414, and power source 416. For example, base device 2 may be a mobile phone, headset, PDA, smartphone, portable computer, or other electronic device.

Bluetooth module 404 includes a processor 406, Bluetooth radio 410, and Bluetooth baseband 412. Bluetooth module 404 also includes a memory 408. Processor 406 executes the programs stored in memory 408. Bluetooth radio 410 includes an antenna port (not shown), and may be implemented on a separate chip. Bluetooth radio 410 may include a Bluetooth compatible transmitter modulator and a Bluetooth compatible receiver modulator. Bluetooth radio 410 is configured to transmit or receive voice or data packets via an antenna.

Processor 406 may include a variety of processors (e.g., digital signal processors), with conventional CPUs being applicable. Memory 456 may include a variety of memories, and in one example includes RAM, ROM, flash memory, or a combination thereof. Memory 408 may further include separate memory structures or a single integrated memory structure. One or more components of Bluetooth module 404 may be integrated with components at base device 2.

Bluetooth client device 4 includes a controller 450, Bluetooth module 452, user interface 462, and power source 464. Bluetooth module 452 includes a processor 454, Bluetooth radio 458, and Bluetooth baseband 460. Bluetooth module 452 also includes a memory 456. Processor 454 executes programs stored in memory 456. Bluetooth radio 458 includes components and operates similar to Bluetooth radio 410 described above. For example, client device 4 may be a mobile phone, headset, PDA, smartphone, portable computer, or other electronic device.

Figure 5:
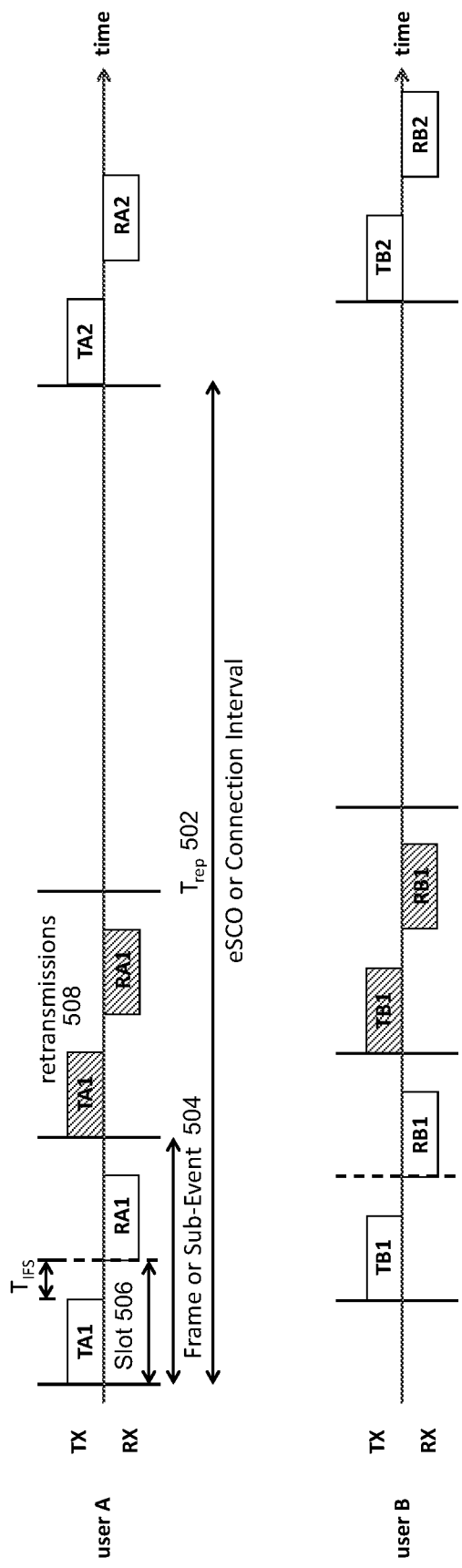
FIG. 5 is a timing diagram of two independent link connections.

Referring to FIGS. 5-13, further description of an example operation of the system illustrated in FIG. 1 is provided. In a wireless office system like Bluetooth, a base device 2 communicates to client device 4 (e.g., a wireless headset) over a time-slotted connection, where each time slot uses a different carrier frequency (frequency hopping). When multiple connections exist in the same area, mutual interference occurs when packets overlap both and frequency and in time (and are received at comparable power levels). An example of timing diagrams of two independent time-slotted connections is shown in FIG. 5. Packets are sent at a certain repetition interval 502. The interval may be divided into frames 504 or slots 506 and packet transmissions and retransmissions may take place. In FIG. 5, only a single retransmission 508 opportunity is shown, but the interval 502 may be filled with multiple retransmission opportunities.

In FIG. 5, time overlap between the connections occurs: packet TB1 of user B may interfere with packets TA1 and/or RA1 of user A when there is also overlap in the frequency domain. Likewise packet RB1 may interfere with packet RA1 and/or the retransmitted packet TA1, whereas the retransmitted packet TB1 may interfere with the retransmitted packets TA1 and/or RA1. The probability of interference will decrease as the duty cycle of the transmissions becomes smaller. The duty cycle is decreased either by the reduction in packet length (which can be achieved by using a lower rate voice codec, higher peak rates, or less overhead like channel coding), or by increasing the repetition interval $T_{rep}$ 502 (thus increasing the latency of the link). A lower probability of interference will directly result in a higher user density, i.e. the number of users sharing a confined area that can communicate simultaneously without noticeable interference.

In FIG. 5, the timing of user A and B is unrelated (i.e., random) and is staggered by a random offset. Further improvement in user density can be achieved by timing synchronization. This is realized by a central transmitter 8 broadcasting a clock signal 10 which is used by all transceivers in range to synchronize their transmissions as shown in FIG. 1. However, that timing synchronization must be applied with care as it does not improve density in all situations.

Figure 6:
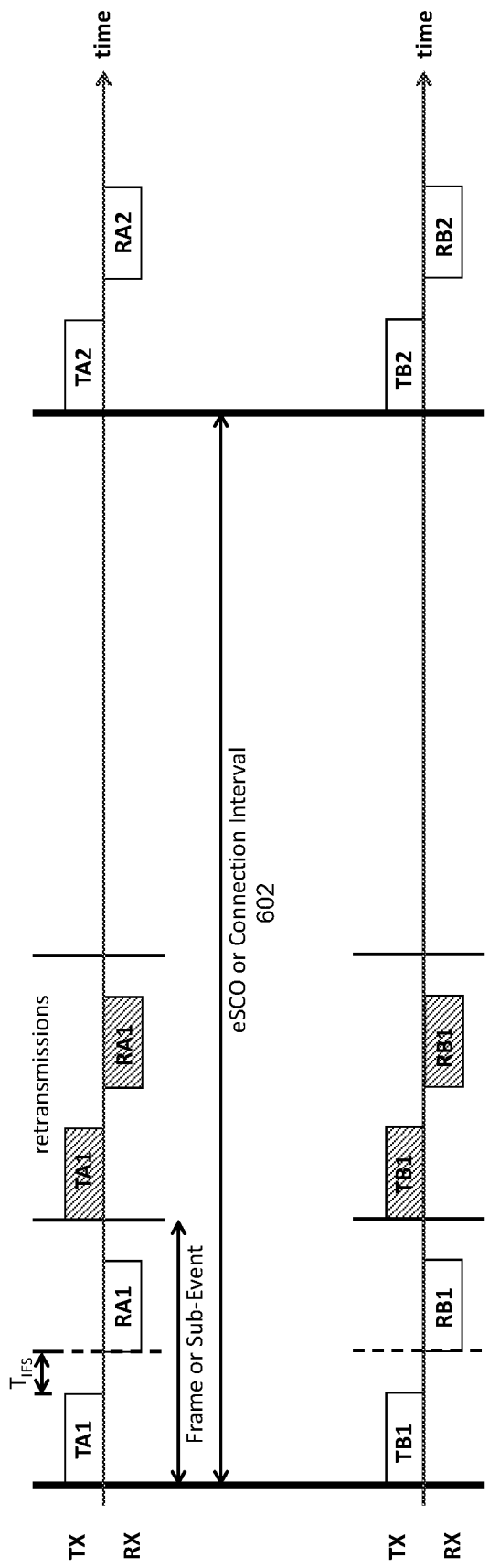
FIG. 6 is a timing diagram of two link connections that are synchronized on the interval.
Figure 7:
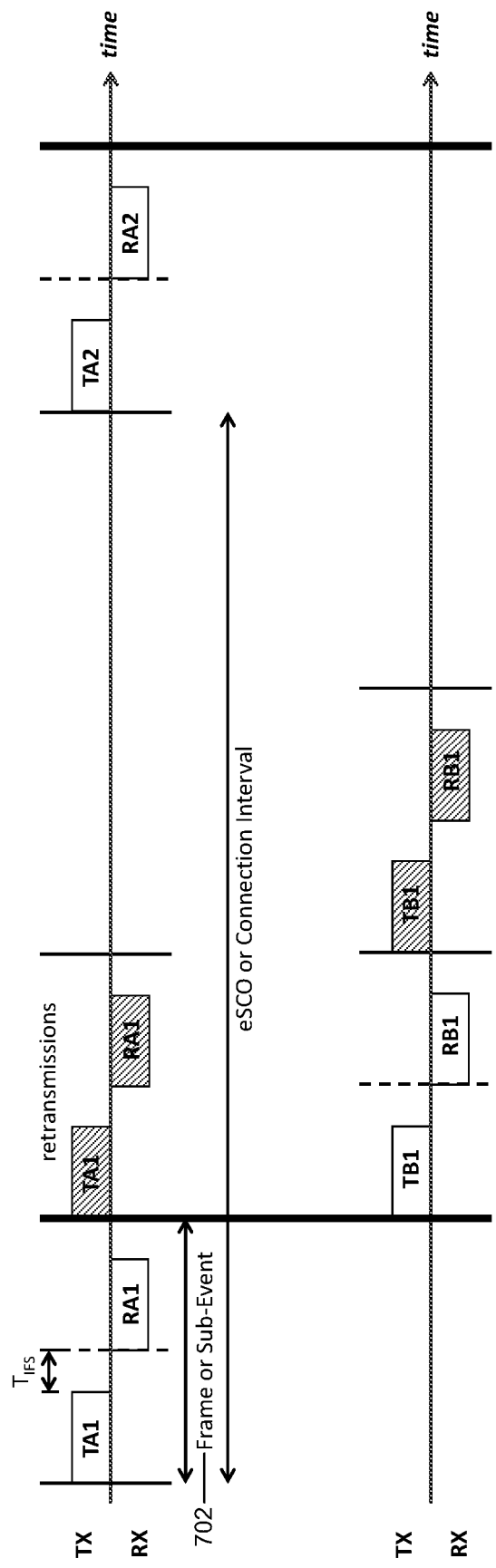
FIG. 7 is a timing diagram of two link connections that are synchronized on the frame.

Referring to FIG. 6 and FIG. 7, two types of timing synchronization may be applied. Firstly, synchronization can be based on aligning the repetition intervals 602 (e.g., the eSCO interval for Bluetooth Classic and the Connection interval for Bluetooth Low Energy), an example of which is shown in FIG. 6.

Secondly, synchronization can be based on aligning the frames 702 (or sub-events proposed for audio transfer in Bluetooth LE) as shown in FIG. 7. In this case, the timings of the different connections are staggered by multiple times the frame length 702 (or slot length). In FIG. 7, a staggering by a single frame length 702 is visualized. FIG. 6 is a subset of the situation in FIG. 7 for the special case the staggering is zero or a multiple times the interval 602.

However, interval aligning may not provide the desired density gain, and gives even worse density performance than no timing alignment (random timing) in certain cases. This is the case when the duty cycles are low, e.g. long repetition intervals relative to short packet lengths and/or few retransmissions. The reason is that with interval alignment, all transmissions are concentrated at the beginning of the interval and coincide in time. The remainder of the interval contains silent areas where undisturbed communications could occur but this is not exploited. In this situation, frame alignment is a better choice as various transmissions are spread out over time and are not concentrated at the beginning of the interval. Frame alignment will also outperform random timing because no partial overlap can occur, thus reducing the number of occasions in time where collisions may take place.

Yet, for higher duty cycles, say 50% or more (including retransmissions), there rarely are silent areas in the interval. In this case, the interval alignment wins from the random timing due to the absence of partial overlap, but it also wins from the frame alignment due to the changing error distributions.

Figure 8B:
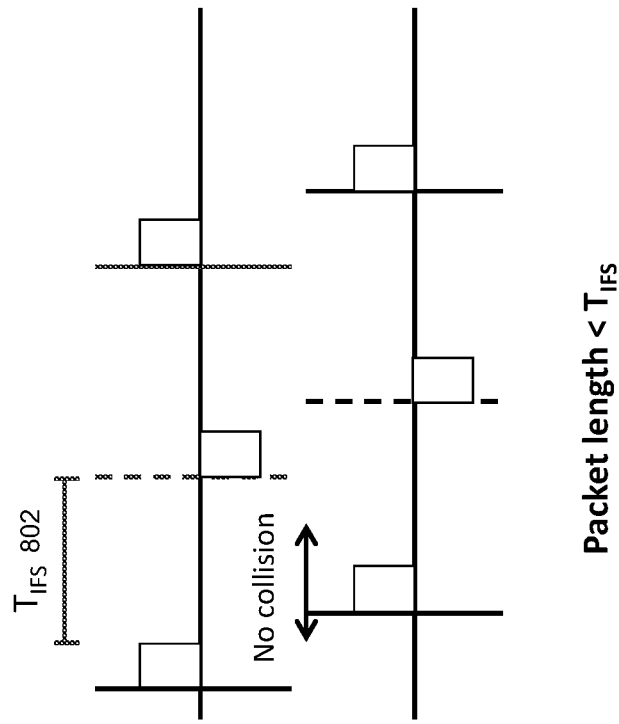
FIGS. 8A-8B illustrates a high duty cycle and low duty cycle on a frame level, respectively.
Figure 8A:
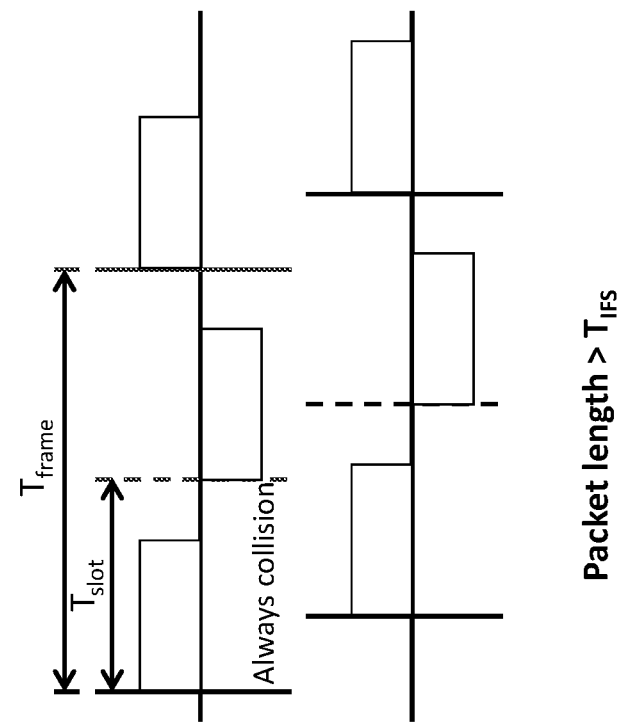

Thus far, it was assumed that the packet length exceeded half the slot length (making the duty cycle within the frame larger than 50%), as shown in FIG. 8A. However, what was discussed before on a macroscale for the packet length and the repetition interval also holds for the packet length and the slot length on a microscale.

Figure 9:
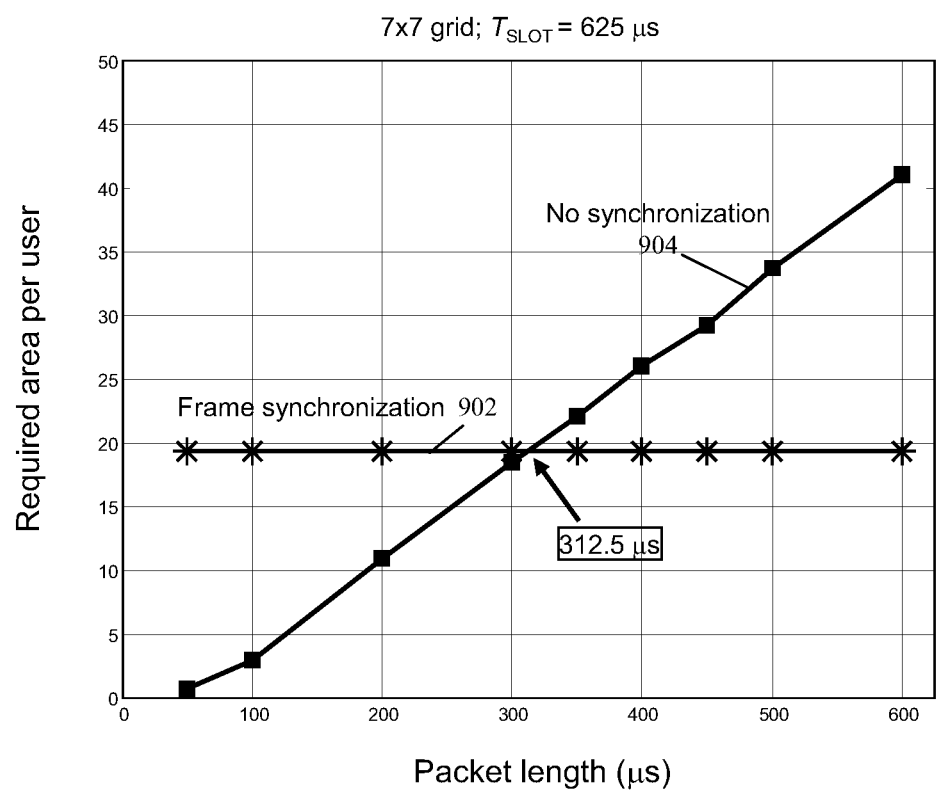
FIG. 9 illustrates density (area per user) as a function of packet length.

If the packet length is smaller than the inter-packet spacing $T_{IFS}$ 802, another packet will fit in that space without overlap, as shown in FIG. 8B. Simulations have confirmed this as is shown in FIG. 9. In this particular case, the slot length measures 625 μs (e.g., for Bluetooth Classic) and the packet length varies. Both random timing and frame synchronization were studied. Referring to FIG. 9, in the case of frame synchronization (plot 902), the performance is independent on the packet length (the packets align, and there is a complete hit or no hit). In the case of random timing (plot 904), duty cycle makes a difference and the density performance is inversely proportional to the packet length. When the packet length becomes smaller than the inter-packet spacing ($T_{IFS}=T_{slot}-L_{packet}$), random timing outperforms frame synchronization because the space between packets is open for another packet to fit without overlap.

As was described above, duty cycle on macroscale (related to the repetition interval $T_{rep}$) and on microscale (based on the inter-packet spacing $T_{IFS}$) determine whether the density is served by synchronization based on interval level, synchronization based on frame level, or just random timing. The duty cycle itself depends on (a) the peak data rate: higher peak rates result in shorter packets, (b) voice codec rates: lower voice rates result in shorter payloads, (c) robustness: more overhead makes the packets more robust, but also longer, and (d) latency: short latency result in shorter repetition times (and more overhead).

Based on the link conditions, an individual system (i.e. headset-base station combination) may select a desired set of parameters that impact the duty cycle. Based on the duty cycle, the system may opt for synchronization towards a central clock signal based on interval synchronization or frame synchronization. In one example, a table with rows listing all possible combinations of parameter settings is utilized. Each row is then assigned the best selection for the timing alignment, i.e. interval synchronization, frame synchronization, or no synchronization at all (random timing). In an area, different systems may coexist that use different synchronization schemes.

Further discussion of the selection of synchronization method based on the local parameters is now provided. As described above, duty cycle on macroscale (related to the repetition interval $T_{rep}$) and on microscale (based on the inter-packet spacing $T_{IFS}$) determine whether the user density is served by timing synchronization based on interval level, synchronization based on frame level, or just random timing (i.e., no synchronization).

Based on the link conditions, an individual system (i.e. headset-base station combination) may select a desired set of parameters. This set of parameters may impact the duty cycle. As an example, consider the following parameters:

Voice codec rate: $R_{codec}$ in kb/s

Repetition interval new voice packet: $T_{rep}$ in ms

From these two parameters, the number of bits $N_{bit}$ carried per (new) voice packet can be derived:

$$N_{bit}=R_{codec} \cdot T_{rep}$$

Figure 11A:
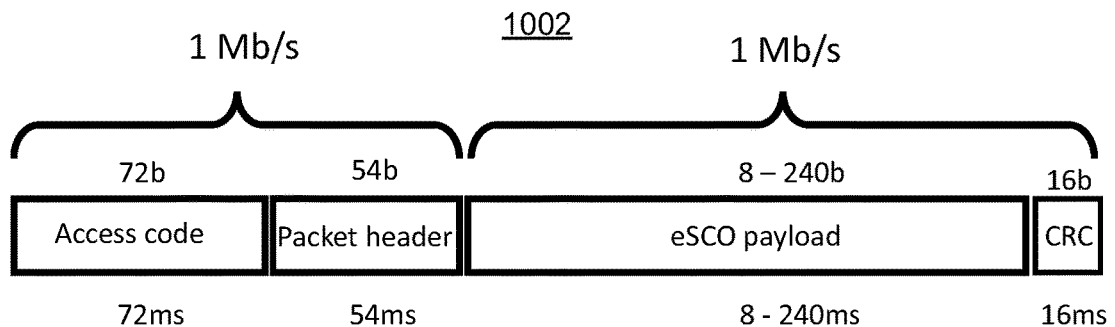
FIGS. 11A-11C illustrate the packet formats of the packets shown in FIG. 10.
Figure 11B:
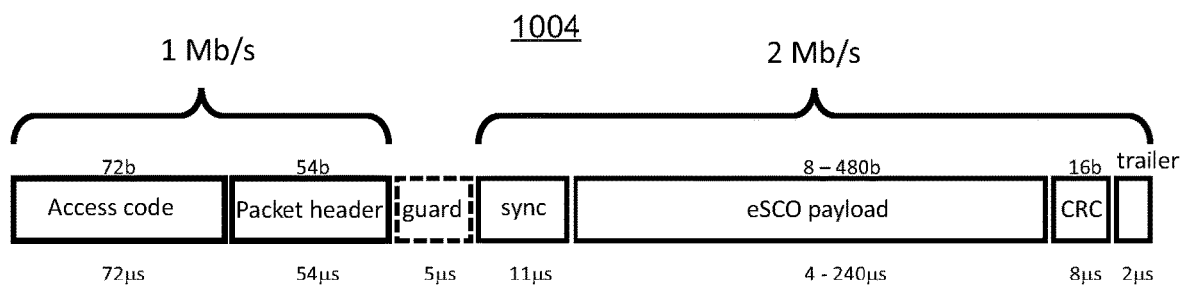
Figure 11C:
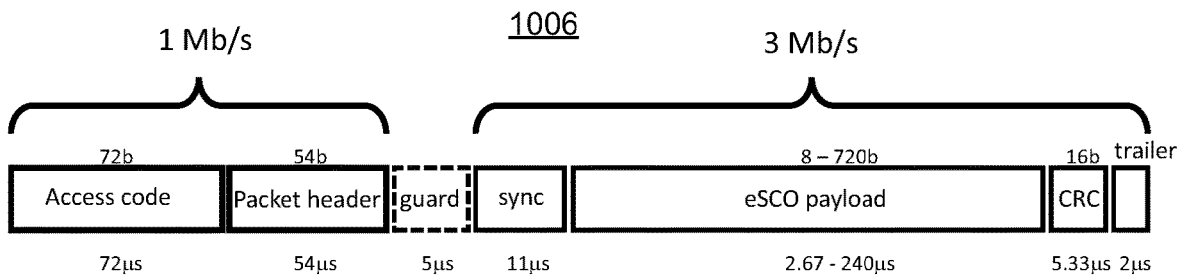

These bits need to be carried by a packet specified by the protocol. The protocol may have several packet types available the system may select from. This selection may be based on the current link conditions. For example, if the link quality is high (which can be derived from the fact that few packet errors occur giving rise to few packet retransmissions), a packet type may be used that applies a modulation scheme with a high peak rate (e.g. multiple bits per symbol) and no forward error correction. For the eSCO connection in Bluetooth, for example, we may choose between the following packet types (only packet types are listed that cover a single Bluetooth slot of 625 μs):

The packet formats of the packets 1002, 1004, and 1006 in table 1000 shown in FIG. 10 are shown in FIGS. 11A-11C. FIG. 11A illustrates a Bluetooth voice packet 1002 for 1 Mb/s GFSK. FIG. 11B illustrates a Bluetooth voice packet 1004 for 2 Mb/s π/4-DQPSK. FIG. 11C illustrates a Bluetooth voice packet 1006 for 3 Mb/s 8-DPSK.

For each packet format there is a fixed overhead of 126 μs represented by the access code and packet header which is always sent at 1 Mb/s GFSK. Based on the number of information bits to be carried (derived from $R_{codec}$ and $T_{rep}$), the length of the packet $L_{packet}$ can be derived, taking into account the overhead and modulation type applied in the payload. In table 1200 shown in FIG. 12, some examples for different voice codec rates $R_{codec}$ 1204 and repetition intervals $T_{rep}$ 1202 are listed with the packet length $L_{packet}$ 1206 for the different packet types. Note that the maximum number of bits an EV3 packet can carry is 240. For larger eSCO intervals and higher voice rates (e.g. 7.5 ms interval with 64 kb/s voice rate), EV3 cannot be applied. For 2-EV3 and 3-EV3, the payload can carry 480 and 720 bits, respectively. These packets can carry links with higher codec rates and longer repetition intervals.

Knowing that the slot length in Bluetooth is 625 μs, based on the packet lengths 1206 listed in table 1200, a first selection of synchronization method can be determined. For all packets with length smaller than half the slot length, i.e. 312.5 μs, no synchronization should be applied. Column 1208 in table 1200 shows whether timing synchronization to a central controller should be applied or not.

When timing synchronization is applied, further examination of the link quality reveals whether synchronization on interval level or frame level should be applied in one embodiment. When the error conditions are such that the duty cycle on a macroscale level is higher than 50%, timing synchronization on an interval level should be applied.

In one implementation, a look-up table (LUT) with parameter combinations most used is created. FIG. 13 is a table illustrating lookup of whether frame synchronization, interval synchronization, or random timing is utilized. Input to the LUT 1300 are the voice codec rate $R_{codec}$ 1302, the eSCO interval $T_{rep}$ 1304, the packet type 1306 used, and the average number of retransmissions 1308 experienced on the link. The packet type used and the number of retransmissions are inter-related: a higher-modulation packet may be more susceptible to noise and interference, leading to more retransmissions.

In various embodiments, the techniques of FIGS. 14-17 discussed below may be implemented as sequences of instructions executed by one or more electronic systems. For example, one or more electronic systems as shown in FIGS. 1-4 are utilized.

Figure 14:
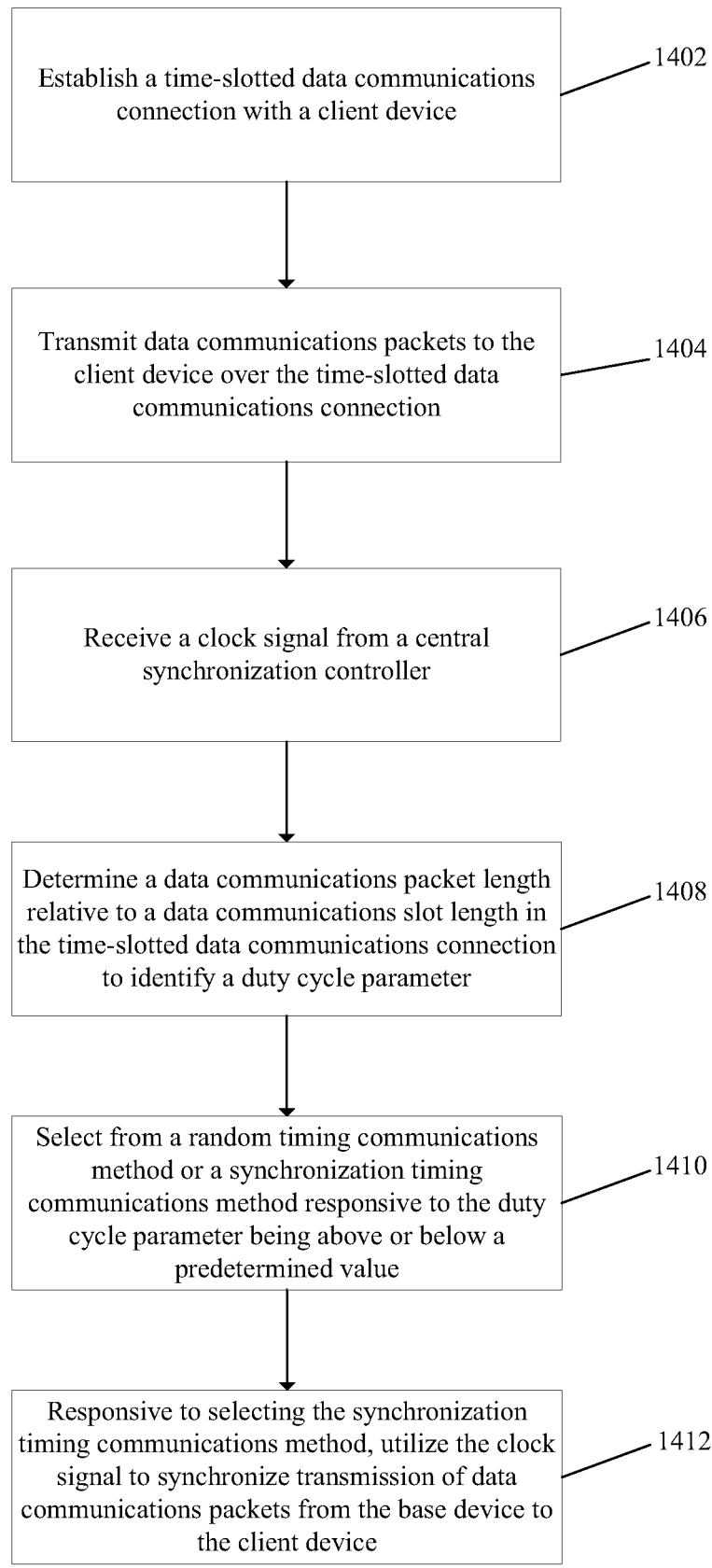
FIG. 14 is a flow diagram illustrating adaptive timing synchronization in one example.

FIG. 14 is a flow diagram illustrating adaptive timing synchronization in one example. At block 1402, a time-slotted data communications connection between a base device and a client device is established. In one example the base device is a Bluetooth base station and the client device is a Bluetooth headset. In one example the time-slotted data communications connection is a Bluetooth protocol connection and the data communications slot length is 625 microseconds.

At block 1404, data communications packets are transmitted to the client device over the time-slotted data communications connection. At block 1406, a clock signal is received from a central synchronization controller. At block 1408, a data communications packet length relative to a data communications slot length in the time-slotted data communications connection is determined to identify a duty cycle parameter.

At block 1410, a random timing communications method or a synchronization timing communications method is selected responsive to the duty cycle parameter being above or below a predetermined value. In one example the synchronization timing communication method is a frame synchronization timing communications method. In one example the duty cycle parameter is a ratio of the data communications packet length and the data communications slot length and the predetermined value is 50 percent. In one example, the random timing communications method is selected responsive to the duty cycle parameter being below a predetermined value and the synchronization timing communications method is selected responsive to the duty cycle parameter being above the predetermined value.

At block 1412, responsive to selecting the synchronization timing communications method, the clock signal is utilized to synchronize transmission of data communications packets from the base device to the client device.

In one example, the process further includes, responsive to selecting the synchronization timing communications method, selecting from between a frame synchronization timing communications method and a repetition interval synchronization timing communications method. A sum of the data communications packet lengths including retransmissions transmitted during a repetition interval is determined relative to a length of the repetition interval in the time-slotted data communications connection to generate a second duty cycle parameter. The frame synchronization timing communications method is selected responsive to the second duty cycle parameter being below a second predetermined value, and the repetition interval synchronization timing communications method is selected responsive to the second duty cycle parameter being above the second predetermined value.

In one example, the process further includes establishing a second time-slotted data communications connection between a second base device and a second client device and transmitting data communications packets to the second client device over the second time-slotted data communications connection. The process includes receiving the clock signal from the central synchronization controller. A data communications packet length relative to a data communications slot length in the second time-slotted data communications connection is determined to identify a second duty cycle parameter. A random timing communications method or a synchronization timing communications method is selected responsive to the second duty cycle parameter being above or below a predetermined value. The process further includes, responsive to selecting the synchronization timing communications method, utilizing the clock signal to synchronize transmission of data communications packets from the second base device to the second client device. Transmissions from the base device to the client device are synchronized with transmissions from the second base device to the second client device utilizing the clock signal received from the central synchronization controller.

Figure 15:
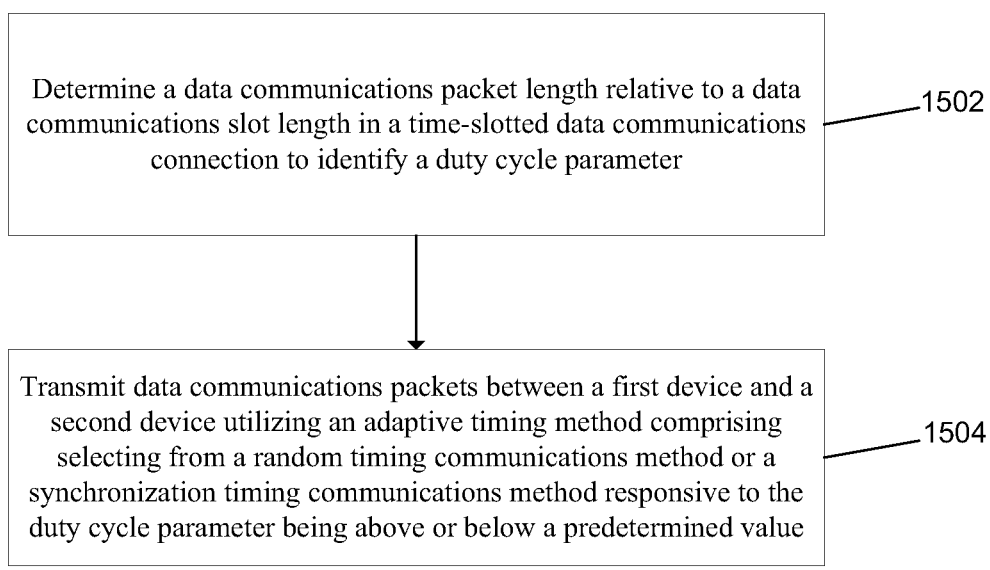
FIG. 15 is a flow diagram illustrating adaptive timing synchronization in one example.

FIG. 15 is a flow diagram illustrating adaptive timing synchronization in one example. At block 1502, a data communications packet length relative to a data communications slot length in a time-slotted data communications connection is determined to identify a duty cycle parameter. In one example, the time-slotted data communications connection is a Bluetooth protocol connection and the data communications slot length is 625 microseconds.

At block 1504, data communications packets are transmitted between a first device and a second device utilizing an adaptive timing method. The adaptive timing method includes selecting from a random timing communications method or a synchronization timing communications method responsive to the duty cycle parameter being above or below a predetermined value. In one example, the duty cycle parameter is a ratio of the data communications packet length and the data communications slot length and the predetermined value is 50 percent.

In one example, the first device is a Bluetooth base station and the second device is a Bluetooth headset. In one example, the synchronization timing communication method is a frame synchronization timing communications method. In one example, the random timing communications method is selected responsive to the duty cycle parameter being below a predetermined value, and the synchronization timing communications method is selected responsive to the duty cycle parameter being above the predetermined value. In one example, the synchronization timing communications method includes receiving and utilizing a broadcast clock signal at the first device or the second device from a central controller device.

In one example the process further includes, responsive to selecting the synchronization timing communications method, selecting from between a frame synchronization timing communications method and a repetition interval synchronization timing communications method.

The frame synchronization timing communications method includes aligning frame boundaries of transmissions by the first device transmission and transmission by the second device, and the repetition interval synchronization timing communications method includes aligning a repetition interval and first transmissions by the first device and the second device. For example, the time-slotted data communications connection is a Bluetooth protocol connection and the repetition interval is a Bluetooth eSCO interval in a Bluetooth Classic implementation or a Bluetooth Connection interval in a Bluetooth Low Energy implementation.

The repetition interval is 7.5 milliseconds (ms). In one example, the frame boundaries include 1.25 millisecond (ms) frames.

A sum of the data communications packet lengths including retransmissions transmitted during a repetition interval relative to a length of the repetition interval in the time-slotted data communications connection is determined to generate a second duty cycle parameter. The frame synchronization timing communications method is selected responsive to the second duty cycle parameter being below a second predetermined value and the repetition interval synchronization timing communications method is selected responsive to the second duty cycle parameter being above the second predetermined value. For example, the second predetermined value is 50 percent.

Figure 16:
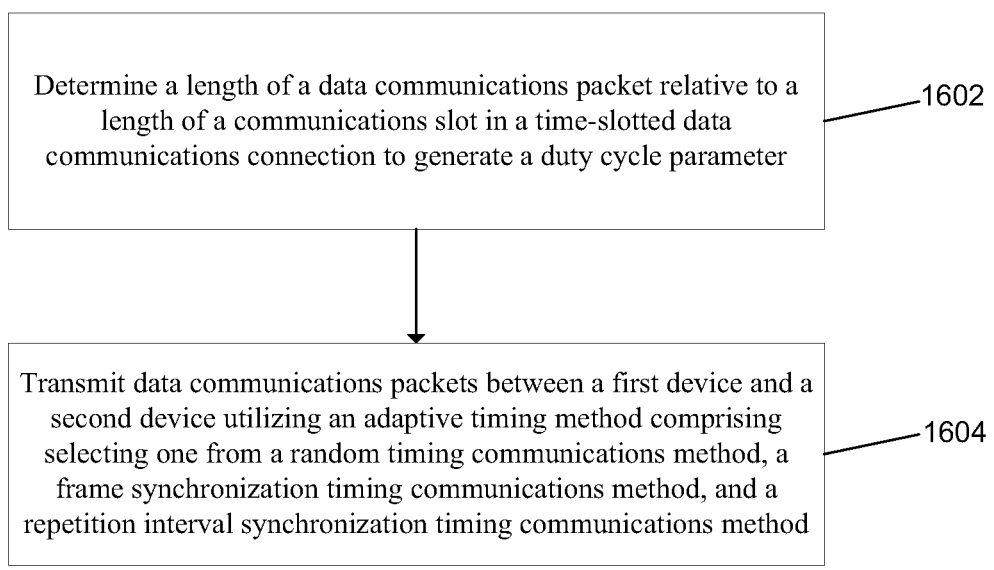
FIG. 16 is a flow diagram illustrating adaptive timing synchronization in one example.

FIG. 16 is a flow diagram illustrating adaptive timing synchronization in one example. At block 1602, a length of a data communications packet relative to a length of a communications slot in a time-slotted data communications connection is determined to generate a duty cycle parameter.

At block 1604, data communications packets are transmitted between a first device and a second device utilizing an adaptive timing method comprising selecting one from a random timing communications method, a frame synchronization timing communications method, and a repetition interval synchronization timing communications method.

In one example, a random timing communications method is selected responsive to the duty cycle parameter being below a predetermined value. Either a frame synchronization timing communications method or a repetition interval synchronization timing communications method is selected responsive to the duty cycle parameter being above the predetermined value. For example, the predetermined value is 50 percent.

To select between the frame synchronization timing communications method and the repetition interval synchronization timing communications method, a sum of the lengths of the data communications packets including retransmissions transmitted during a repetition interval relative to a length of a repetition interval in the time-slotted data communications connection is determined to generate a second duty cycle parameter. The frame synchronization timing communications method is selected responsive to the second duty cycle parameter being below a second predetermined value and the repetition interval synchronization timing communications method is selected responsive to the second duty cycle parameter being above the second predetermined value. For example, the second predetermined value comprises 50 percent.

Figure 17:
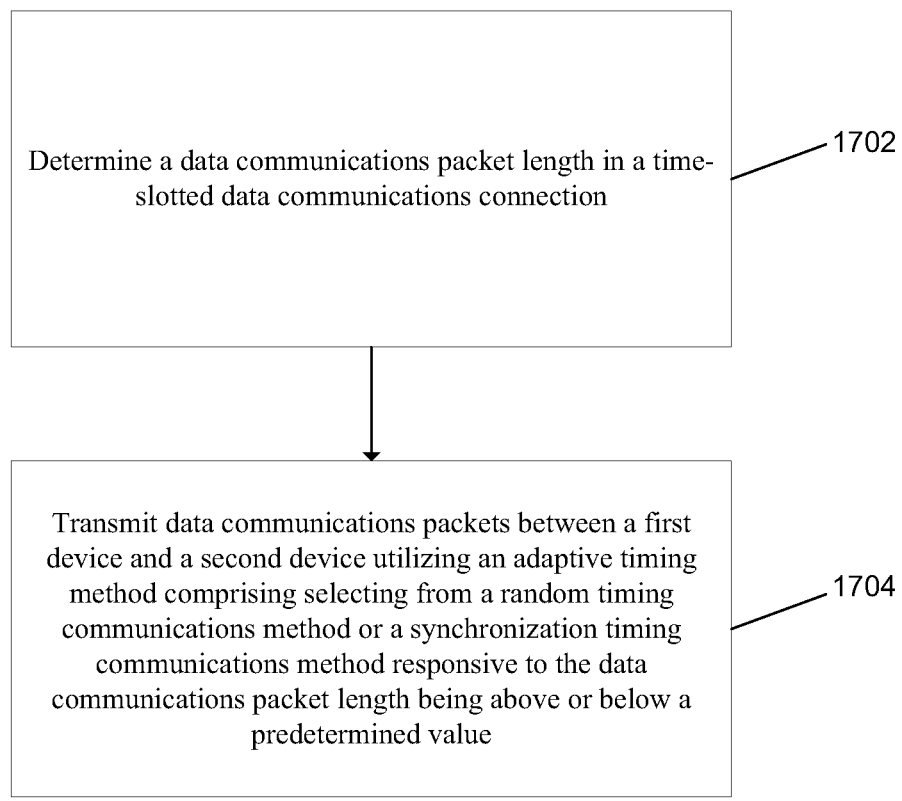
FIG. 17 is a flow diagram illustrating adaptive timing synchronization in one example.

FIG. 17 is a flow diagram illustrating adaptive timing synchronization in one example. At block 1702, a data communications packet length in a time-slotted data communications connection is determined.

At block 1704, data communications packets are transmitted between a first device and a second device utilizing an adaptive timing method comprising selecting from a random timing communications method or a synchronization timing communications method responsive to the data communications packet length being above or below a predetermined value. In one example, the predetermined value is 312.5 microseconds. The random timing communications method is selected responsive to the data communications packet length being below a predetermined value, and the synchronization timing communications method is selected responsive to the data communications packet length being above the predetermined value.

While the exemplary embodiments of the present invention are described and illustrated herein, it will be appreciated that they are merely illustrative and that modifications can be made to these embodiments without departing from the spirit and scope of the invention. For example, although embodiments for Bluetooth and DECT are provided, the described methods apply to other similar packet-based radio systems. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
   determining a data communications packet length relative to a data communications slot length in a first time-slotted data communications connection to identify a duty cycle parameter; and
   transmitting data communications packets between a first base device and a first client device utilizing an adaptive timing method comprising selecting one from a no packet timing alignment transmission method and a packet timing alignment transmission method for transmissions on the first time-slotted data communications connection between the first base device and the first client device and transmissions on a second time-slotted data communications connection between a second base device and a second client device responsive to the duty cycle parameter being above or below a predetermined value, wherein the packet timing alignment transmission method comprises aligning a first packet transmission repetition interval or a first packet transmission frame of a first packet transmitted on the first time-slotted data communications connection with a second packet transmission repetition interval or a second packet transmission frame of a second packet transmitted on the second time-slotted data communications connection, and wherein selecting one from the no packet timing alignment transmission method and the packet timing alignment transmission method comprises:
   selecting the no packet timing alignment transmission method responsive to the duty cycle parameter being below the predetermined value; and selecting the packet timing alignment transmission method responsive to the duty cycle parameter being above the predetermined value.

2. The method of claim 1, wherein the first base device comprises a Bluetooth base station and the first client device comprises a Bluetooth headset.

3. The method of claim 1, wherein the duty cycle parameter comprises a ratio of the data communications packet length and the data communications slot length and the predetermined value comprises 50 percent.

4. The method of claim 1, wherein the packet timing alignment transmission method comprises receiving and utilizing a broadcast clock signal at the first base device or the first client device from a central controller device.

5. The method of claim 1, further comprising:
determining a sum of data communications packet lengths including retransmissions transmitted during a repetition interval relative to a length of the repetition interval in the first time-slotted data communications connection to generate a second duty cycle parameter;
selecting to align the first packet transmission frame of the first packet transmitted on the first time-slotted data communications connection with the second packet transmission frame of the second packet transmitted on the second time-slotted data communications connection responsive to the second duty cycle parameter being below a second predetermined value; and
selecting to align the first packet transmission repetition interval of the first packet transmitted on the first time-slotted data communications connection with the second packet transmission repetition interval of the second packet transmitted on the second time-slotted data communications connection responsive to the second duty cycle parameter being above the second predetermined value.

6. The method of claim 5, wherein the second predetermined value comprises 50 percent.

7. The method of claim 1, wherein the first time-slotted data communications connection comprises a Bluetooth protocol connection and the first packet transmission repetition interval comprises a Bluetooth eSCO interval in a Bluetooth Classic implementation or a Bluetooth Connection interval in a Bluetooth Low Energy implementation.

8. A method for data communications utilizing a first device comprising:
establishing a first time-slotted data communications connection with a second device:
transmitting data communications packets to the second device over the first time-slotted data communications connection;
receiving a clock signal from a central synchronization controller;
determining a data communications packet length relative to a data communications slot length in the first time-slotted data communications connection to identify a duty cycle parameter;
selecting one from a no packet timing alignment transmission method and a packet timing alignment transmission method for transmissions on the first time-slotted data communications connection between the first device and the second device and transmissions on a second time-slotted data communications connection between a third device and a fourth device responsive to the duty cycle parameter being above or below a predetermined value, wherein the packet timing alignment transmission method comprises aligning a first packet transmission repetition interval or a first packet transmission frame of a first packet transmitted on the first time-slotted data communications connection with a second packet transmission repetition interval or a second packet transmission frame of a second packet transmitted on the second time-slotted data communications connection, wherein selecting one from the no packet timing alignment transmission method and the packet timing alignment transmission method comprises:
selecting the no packet timing alignment transmission method responsive to the duty cycle parameter being below the predetermined value; and
selecting the packet timing alignment transmission method responsive to the duty cycle parameter being above the predetermined value; and
responsive to selecting the packet timing alignment transmission method, utilizing the clock signal to align the first packet transmission repetition interval or the first packet transmission frame of the first packet transmitted on the first time-slotted data communications connection with the second packet transmission repetition interval or the second packet transmission frame of the second packet transmitted on the second time-slotted data communications connection.

9. The method of claim 8, wherein the first device comprises a base device and the second device comprises a client device.

10. The method of claim 8, wherein the first device comprises a headset client device and the second device comprises a base device.

11. The method of claim 8, wherein the duty cycle parameter comprises a ratio of the data communications packet length and the data communications slot length and the predetermined value comprises 50 percent.

12. The method of claim 8, further comprising:
determining a sum of data communications packet lengths including retransmissions transmitted during a repetition interval relative to a length of the repetition interval in the first time-slotted data communications connection to generate a second duty cycle parameter;
selecting to align the first packet transmission frame of the first packet transmitted on the first time-slotted data communications connection with the second packet transmission frame of the second packet transmitted on the second time-slotted data communications connection responsive to the second duty cycle parameter being below a second predetermined value; and
selecting to align the first packet transmission repetition interval of the first packet transmitted on the first time-slotted data communications connection with the second packet transmission repetition interval of the second packet transmitted on the second time-slotted data communications connection responsive to the second duty cycle parameter being above the second predetermined value.

13. A system comprising:
a central synchronization controller comprising a radio frequency transceiver configured to broadcast a clock signal;
a first base device from a plurality of base devices configured to:
establish a first time-slotted data communications connection with a first client device;
transmit data communications packets to the first client device over the first time-slotted data communications connection;

receive the clock signal from the central synchronization controller;

determine a data communications packet length relative to a data communications slot length in the first time-slotted data communications connection to identify a duty cycle parameter; and select one from a no packet timing alignment transmission method and a packet timing alignment transmission method for transmissions on the first time-slotted data communications connection between the first base device and the first client device and transmissions on a second time-slotted data communications connection between a second base device and a second client device responsive to the duty cycle parameter being above or below a predetermined value, wherein the packet timing alignment transmission method comprises aligning a first packet transmission repetition interval or a first packet transmission frame of a first packet transmitted on the first time-slotted data communications connection with a second packet transmission repetition interval or a second packet transmission frame of a second packet transmitted on the second time-slotted data communications connection, and wherein to select one from the no packet timing alignment transmission method and the packet timing alignment transmission method comprises:

selecting the no packet timing alignment transmission method responsive to the duty cycle parameter being below the predetermined value; and selecting the packet timing alignment transmission method responsive to the duty cycle parameter being above the predetermined value.

14. The system of claim 13, wherein aligning the first packet transmission repetition interval or the first packet transmission frame of the first packet transmitted on the first time-slotted data communications connection with the second packet transmission repetition interval or the second packet transmission frame of the second packet transmitted on the second time-slotted data communications connection comprises utilizing the clock signal received from the central synchronization controller.

15. The system of claim 13, wherein the first base device comprises a Bluetooth base station and the first client device comprises a Bluetooth headset.

16. The system of claim 13, wherein the duty cycle parameter comprises a ratio of the data communications packet length and the data communications slot length and the predetermined value comprises 50 percent.

* * * * *